Patented June 17, 1947

2,422,646

UNITED STATES PATENT OFFICE 2,422,646

AQUEOUS EMULSIONS AND A PROCESS OF PREPARING THEM

Werner Starck, Hofheim, Taunus, and Heinrich Freudenberger, Frankfort-on-the-Main-Nied, Germany; vested in the Attorney General of the United States No Drawing. Application January 14, 1939, Serial No. 251,044. In Germany January 20, 1938

Sections 3 and 14, Public Law 690, August 8, 1946. Patent expires January 20, 1958

2 Claims. (Cl. 260—32)

This application is a continuation-in-part of our co-pending U. S. application Serial No. 49,642, filed November 13, 1935.

The present invention relates to aqueous emulsions and to a process of preparing them.

Processes are known for the manufacture of aqueous suspensions or emulsions of polymeric vinyl esters. As emulsifying agents there have been used soap-like emulsifying agents or wetting agents or both, such as have been known for dispersing hydrophobic substances in water, for instance for the manufacture of emulsions of oil in water. Now it has been found that if such emulsifying agents, for instance sodium oleate or sodium 12-hydroxy-octadecane-1-sulfonate, are used during the polymerization of vinyl esters, as emulsions of the polyvinyl esters are obtained, the size of the particles of which lies below $0.2\mu$, i. e. the particles of which can no longer be detected by the ordinary microscope but only in the ultra-microscope by the Tyndall-effect. Finely dispersed emulsions of this kind have various drawbacks in industry: on the one hand the emulsions are very thinly liquid, i. e. they cannot be spread in the manner possible for a solution having the same concentration of the polymeric body in an organic solvent; furthermore, these finely dispersed emulsions are not stable and tend to coagulate on addition of electrolytes, pigments and other adjuvants; on the other hand the large surface of the dispersed phase affords an extensive front for the attack of the dispersing agent (water) which readily leads to a chemical alteration of the polymeric body. In emulsions from polyvinyl acetate prepared in the presence of soaps, for instance, the polyvinyl ester is saponified after a short time, the reaction being accelerated by the emulsifying agent having in most cases a feebly alkaline and, therefore, ester-cleaving action.

On the other hand granular or spherical polymerizates from vinyl esters have been made in aqueous solutions of water-soluble compounds having a high molecular weight, for instance water-soluble cellulose derivatives, starch, polyvinyl alcohol and the like. In this process polymerizates are obtained the size of the particles of which lies between 0.025 and 2.5 millimeters. The polymerizates separate from the liquor and therefore may be filtered after their preparation. The water-soluble adjuvant substances of high molecular weight therefore are only of an intermediary importance during the polymerization process.

Now we have found that stable and viscous emulsions of high percentage strength and capable of being spread may be obtained from polyvinyl esters by polymerizing the vinyl esters in aqueous solutions of polyvinyl alcohol, the viscosity of the solutions being at least 20 centipoises. On further investigating this process it has been found that emulsions of polyvinyl esters are obtained the size of the particles of which lies between about 0.5 and about $10\mu$. These emulsions are stable for an unlimited time and have, if they contain, for instance, 50–80 per cent. of polymeride, a consistency capable of being spead, like concentrated natural latex. The particles of such emulsions can be seen under the microscope and exhibit Brownian movement; when obtained according to this method of operating, therefore, as regards their order of magnitude, they are between those obtained by the two known processes described above.

During this method of polymerization the polyvinyl alcohol acts during the polymerization process not only as an emulsifying agent but also as a protective colloid for the polymeric product formed and hinders the sedimentation of the particles. For the manufacture of emulsions from vinyl esters having the size of particles described above, for instance 100 parts by weight of vinyl acetate, are heated, while stirring, in 100 parts by weight of an aqueous solution of 5 per cent strength of polyvinyl alcohol having a viscosity of 140 centipoises, while applying catalysts of the peroxide series, such as hydrogen peroxide. The same effect, however, is obtained when applying isoviscous solutions of a higher or lower polymeric polyvinyl alcohol. During this process it seems to be suitable to use solutions of low concentration of 20–250 centipoises viscosity, of a polymeric polyvinyl alcohol as highly polymerised as possible in order to maintain the portion of the water-soluble component in the finished emulsion as low as possible. During the polymerization the mixture is suitably maintained feebly acid by the addition of small quantities of organic acids. Thereby the polymerization process is accelerated; in this manner the time during which the monomeric vinyl ester remains in the aqueous dispersion phase is reduced to a minimum.

Instead of polyvinyl alcohol or a mixture comprising polyvinyl alcohol there may be used the water-soluble derivatives of the polyvinyl alcohol, for instance a polyvinyl alcohol the hydroxyl groups of which were partly transformed with aldehydes into acetal-like products. Such aldehydes are for instance formaldehyde, acetaldehyde, propionaldehyde, butyraldehyde or isobutyraldehyde. There are furthermore useful the water-soluble, partially saponified esters of polyvinyl alcohol with organic carboxylic acids, for instance partially saponified polyvinyl formate, polyvinyl acetate, polyvinyl proprionate or polyvinyl butyrate.

There may be polymerized the vinyl esters of organic carboxylic acids, for instance vinyl formate, vinyl acetate, vinyl propionate, vinyl butyrate, vinyl chloracetate, vinyl methoxacetate or vinyl ethoxacetate, or mixtures of these esters. The esters may also be polymerized in mixture with other compounds yielding interpolymerization products together with said esters, for instance with vinyl chloride, acrylic acid methyl ester and acrylic acid ethyl ester, methacrylic acid methyl ester and methacrylic acid ethyl ester, maleic acid dimethyl ester and maleic acid diethyl ester, fumaric acid dimethyl ester and fumaric acid diethyl ester, crotonic acid methyl ester and crotonic acid ethyl ester.

The polymerization may be carried out in the usual manner, for instance at a temperature between room temperature and about 100° C. As catalysts there are useful potassium persulfate, sodium persulfate or ammonium persulfate; potassium perborate, sodium perborate or ammonium perborate; hydrogen peroxide. These catalysts are added to the aqueous medium. Organic peroxides, such as benzoyl peroxide, may be used simultaneously or alone; they are preferably dissolved in the monomeric compound to be polymerized.

Softening agents, filling agents or other effect substances may be added to the emulsions before, during or after the polymerization.

The viscosities of the aqueous solutions may be determined in a ball viscosimeter according to Höppler. The viscosity determinations relate to a temperature of 20° C.

The following examples serve to illustrate the invention, but they are not intended to limit it thereto, the parts being by weight:

1. 0.4 part of lactic acid and 1 part of potassium perborate are dissolved in 400 parts of an aqueous polyvinyl alcohol solution of 6 per cent strength having a viscosity of about 140 centipoises. This solution is heated to 80° C.–85° C. in a stirring vessel provided with a reflux apparatus and 600 parts of vinyl propionate are introduced, while well stirring. Polymerization sets in, accompanied by strong boiling and evolution of heat. The reaction is finished when the reflux ceases and the temperature decreases. A highly viscous emulsion capable of being spread and of a good stability is obtained. The emulsified particles have the size of about 1–2$\mu$.

2. 1 part of formic acid and 2 parts of hydrogen peroxide of 30 per cent strength are dissolved in 1000 parts of an aqueous solution of 5 per cent strength of polyvinyl alcohol, having a high molecular weight, and a viscosity of about 150 centipoises. This solution is heated in an enameled stirring vessel provided with a reflux apparatus to 65° C.–70° C., while well stirring. 1000 parts of vinyl acetate are then introduced in a slow current. During the strongly exothermic reaction the temperature increases to 93° C. After the polymerization reaction is terminated, i. e. when the temperature in the interior of the vessel decreases, the whole is further heated for one hour at 80° C.–85° C. After cooling a highly viscous, stable emulsion capable of being readily spread is obtained. The dispersed particles have a diameter of 0.5–1$\mu$.

3. 0.75 part of glacial acetic acid and 2 parts of hydrogen peroxide of 30 per cent strength are dissolved in 500 parts of an aqueous solution of a low viscous polyvinyl alcohol of 10 per cent strength containing 7 per cent of acetyl groups and having a viscosity of about 80 centipoises. The solution is heated as described in the foregoing examples. A mixture of 400 parts of vinyl acetate and 100 parts of vinyl-butoxy-acetate is then introduced. After the polymerization is terminated a stable emulsion is obtained which when dried, for instance upon textile fabric, leaves an elastic film.

4. 1.2 parts of formic acid and 2 parts of hydrogen peroxide of 30 per cent strength are added to 1000 parts of an aqueous solution of 40 per cent strength of polyvinyl alcohol containing 6 percent of acetaldehyde groups in an acetal-like linkage and having in a solution of 4 per cent strength a viscosity of about 25 centipoises. This solution is mixed in a vessel, while rapidly stirring, with 1000 parts of vinyl acetate. A stable emulsion of monomeric vinyl ester is obtained in the aqueous phase. This emulsion is allowed to run from a reservoir into an enameled vessel heated to 80° C. The velocity of admission is suitably determined according to the course of the polymerization reaction. After the reaction is finished a creamy emulsion is obtained the particles of which have a size of 1–3$\mu$.

We claim:
1. The process which comprises polymerizing an emulsion of a mixture of vinyl acetate and vinyl butoxy-acetate in an aqueous solution of polyvinyl alcohol, said solution having a viscosity of about 80 centipoises and containing hydrogen peroxide as a catalyst.

2. Aqueous emulsions prepared in accordance with claim 1, said emulsions being stable and containing particles of a diameter between about 0.5 and about 10$\mu$.

WERNER STARCK.
HEINRICH FREUDENBERGER.

REFERENCES CITED

The following references are of record in the file of this patent:

UNITED STATES PATENTS

| Number | Name | Date |
| --- | --- | --- |
| 2,108,857 | Hopff | Feb. 22, 1938 |
| 2,007,557 | Blaikie et al. | July 9, 1935 |
| 2,227,163 | Starck et al. | Dec. 31, 1940 |

FOREIGN PATENTS

| Number | Country | Date |
| --- | --- | --- |
| 356,408 | Great Britain | Sept. 10, 1931 |

OTHER REFERENCES

Hermann et al., D. C. G. Berichte 60, 1660–1, 1927.